United States Patent [19]

Stuermer et al.

[11] Patent Number: 4,749,913
[45] Date of Patent: Jun. 7, 1988

[54] OPERATING CIRCUIT FOR A DIRECT CURRENT DISCHARGE LAMP

[75] Inventors: Karl Stuermer, Mentor; William M. Rucki, Euclid; Spiro Vamvakas, North Royalton, all of Ohio

[73] Assignee: General Electric Company, Schenectady, N.Y.

[21] Appl. No.: 39,413

[22] Filed: Apr. 17, 1987

[51] Int. Cl.⁴ ............................................. H05B 41/16
[52] U.S. Cl. .................... 315/175; 315/200 R; 315/206; 315/172; 315/220; 315/277; 315/DIG. 7
[58] Field of Search ............ 315/200 R, 175, 160, 315/208, 205, 206, 219, DIG. 7, 199, 306, 307, 49, 92, 210, 172, 176, 220

[56] References Cited

U.S. PATENT DOCUMENTS

| | | | |
|---|---|---|---|
| 4,340,843 | 7/1982 | Anderson | 315/205 |
| 4,350,930 | 9/1982 | Peil et al. | 315/92 |
| 4,398,130 | 8/1983 | McFadyen et al. | 315/210 |
| 4,399,392 | 8/1983 | Buhrer | 315/92 |
| 4,471,268 | 9/1984 | Brown et al. | 315/219 |
| 4,550,272 | 10/1985 | Kimura et al. | 315/92 |

Primary Examiner—David K. Moore
Assistant Examiner—Mark R. Powell
Attorney, Agent, or Firm—John P. McMahon; Philip L. Schlamp; Fred Jacob

[57] ABSTRACT

A power supply for a metal halide discharge lamp includes a circuit for applying a high voltage starting pulse to the arc tube of the lamp to initiate the discharge, a glow transition current to provide power transitioning the arc tube from its glow to its run mode, and a run power supply circuit to provide continuous controlled d-c current to the arc tube.

4 Claims, 3 Drawing Sheets

Fig. 3
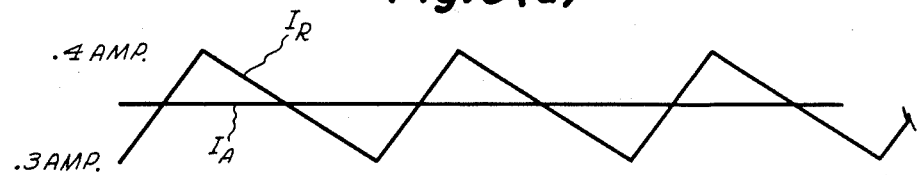
*Fig. 3(a)*
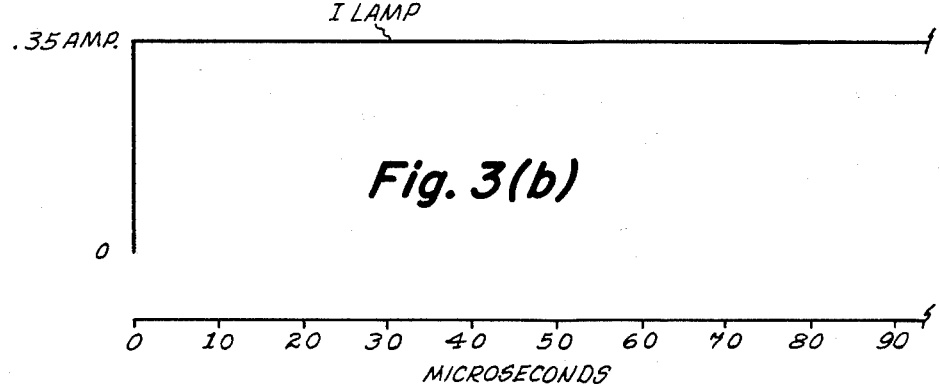
*Fig. 3(b)*

OPERATING CIRCUIT FOR A DIRECT CURRENT DISCHARGE LAMP

FIELD OF THE INVENTION

This invention relates to power supply circuits for discharge lamps and, more particularly, to a solid state circuit for starting and operating a direct-current (d-c) type discharge lamp.

BACKGROUND OF THE INVENTION

High intensity discharge arc lamps commonly operate in three modes:

(1) a cold or starting mode, comprising a glow breakdown state followed by a glow to arc transition state, in which a relatively high value of a-c or d-c type starting voltage is applied across the lamps electrodes to first place the gases of the lamp into a suitable ionized condition for striking or initiating a glow state, which is followed by a delay time period of up to approximately a minute so as to allow a transition into an arc condition between the electrodes of the lamp;

(2) an operating mode, in which the arc discharge of the lamp generates a desired light output and a relatively low or moderate voltage occurs across the electrodes of the lamp in response to a suitable arc discharge current as established by the ballast or operating circuit related to the lamp; and (3) a hot restart mode, in which the arc discharge of the lamp fails or extinguishes for some reason such as a momentary interruption of the current supplied to the lamp. If the arc condition extinguishes, the lamp is permitted to cool for a period of up to a minute or more before the arc condition can be restarted by the relatively high starting voltage.

An example of a prior art circuit for operating gas discharge lamps is disclosed in U.S. Pat. No. 4,340,843, issued July 20, 1982 to Thomas E. Anderson and assigned to the present assignee. The Anderson patent discloses a circuit for starting and operating a compact high intensity arc discharge lamp which circuit includes a keep alive feature to prevent the arc condition of the lamp from extinguishing during undesired power fluctuations. The keep alive feature is provided by a related circuit for activating a pulse generating circuit connected to the lamp whenever the arc current within the lamp fell below a predetermined value and also inactivating the pulse generating circuit whenever the arc current rose above a second predetermined value.

SUMMARY OF THE INVENTION

An object of the present invention is to provide an improved circuit for starting and operating a direct current (d-c) type discharge lamp. A more specific object of the present invention is to provide an inductively ballasted, high efficiency power supply circuit for starting and operating a compact d-c, arc discharge lamp.

The invention comprises, briefly and in a preferred embodiment, a controlled power supply circuit having an input circuit for converting an applied a-c voltage input to d-c voltage, a controlled high voltage lamp starting circuit, a glow to arc transition circuit, and a run circuit for operating the discharge lamp. The controlled power supply operates such as to apply a relatively high d-c potential for a relatively short duration across the discharge lamp to initiate its ionization condition. The controlled power supply then applies a rising current to the lamp till a predetermined maximum value is reached. The supply then provides a decreasing current till a second, lower, limit is reached. This cycle is repeated to regulate the current to the lamp about a predetermined average value.

BRIEF DESCRIPTION OF THE DRAWINGS

Further objects and advantages of the present invention, together with its organization, method of operation and its best mode contemplated, may best be understood by reference to the following description taken in conjunction with the accompanying drawing in which:

FIGS. 3(a) and 3(b) are timing diagram illustrating the waveforms of the run current for the circuit of the present invention.

DESCRIPTION OF THE PREFERRED EMBODIMENTS

Figure 1:
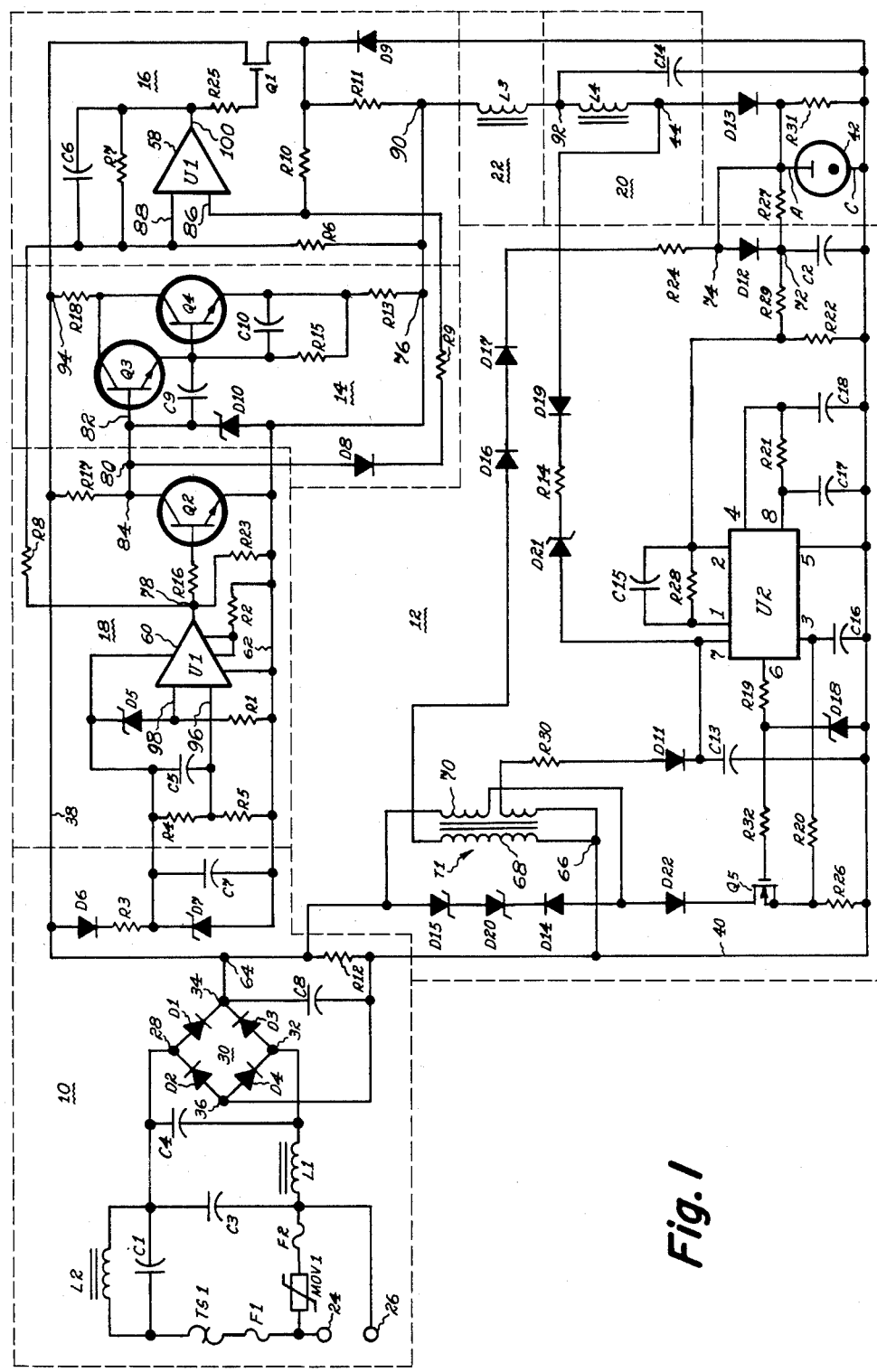
FIG. 1 is a schematic circuit diagram illustrating the power supply circuit of the present invention.

The power supply circuit of the present invention is shown schematically in FIG. 1. A-C power from a standard source, for example 277 volt a-c, is supplied to the line voltage input and d-c supply circuit 10, which, in turn, supplies a rectified output signal to the high voltage supply and discharge circuit 12, a glow power source 14 and a run circuit 16. The power supply 10 also provides d-c power to glow transition timer 18, LC filter 20, and ballast inductor 22. The outputs from the high voltage supply circuit 12, and the LC filter 20 are connected to the discharge lamp 42.

The input a-c power is connected at terminals 24 and 26 of the line voltage input supply 10. One side of the a-c power, terminal 24, is fused, as shown by F1 which is further connected via switch TS1, a thermal cutout, to inductor L2 having a typical value of 600 millihenries, capacitor C1 having a typical value of 0.47 microfarads and to an a-c or input terminal 28 of a rectifier bridge 30. The input terminal 26 is connected to an inductor L1 having a typical value of 0.35 millihenries and to a-c or input terminal 32 of rectifier bridge 30. A capacitor C3 having a typical value of 0.047 microfarads is connected between one end of C1 and one end of fuse F2. A capacitor C4 having a typical value of 0.001 microfarads is connected across terminals 28 and 32 of bridge 30. The bridge circuit 30 comprises diodes D1, D2, D3 and D4 connected as shown to form a full-wave rectifier. The terminals 34 and 36 provide a d-c output of the bridge circuit which is filtered by capacitor C8 having a typical value of 30 microfarads and a resistor R12 having a typical value of 1 megaohm so as to provide a controlled ripple d-c output therefrom. The input supply 10 also includes a network output filter connected to terminal 34 and consisting of serially connected resistor R3 having a typical value of 62 kilhoms and a diode D6, which, in turn, is serially connected to a parallel arrangement of capacitor C7 having a typical value of 0.1 microfarad, and zener diode D7.

The high voltage starting supply 12 includes autotransformers T1, pulse width modulator U2, transistors Q5, capacitors C2, C13, C15, C16, C17 and C18, diodes D11, D12, D14, D16, D17, D19 and D22, zener diodes D15, D18, D20 and D21 and resistors R14, R19, R20, R21, R22, R24, R26, R28, R29, R30 and R32 arranged and connected as shown in FIG. 1. The components of high voltage starting supply 12 are of the type or have a typical value as given in Table 1.

TABLE 1

| | |
|---|---|
| autotransformer T1 | GE type having Drawing No. 24A521748 |
| Pulse width modulator 42 | UC3842 |
| Transistor Q5 | N Channel Power Mosfet |
| Capacitors | |
| C2 | 0.003 microfarads |
| C13 | 1 microfarad |
| C15 | 0.00068 microfarads |
| C16 | 0.003 microfarads |
| C17 and | 0.01 microfarads |
| C18 | 0.0033 microfarads |
| Diodes | |
| D11 | 1N914 |
| D12 | ESIF |
| D14 | R62A |
| D15 | 150 V |
| D16 | ESIF |
| D17 | ESIF |
| D18 | 20 V 10% 1 W |
| D19 | ESIF |
| D20 | 150 V |
| D21 and | 100 V |
| D22 | R62A |
| Resistors | |
| R14 | 100Kohms |
| R19 | 100 ohms |
| R20 | 330 ohms |
| R21 | 52.3Kohms ± 1% |
| R22 | 10Kohms ± 1% |
| R24 | 3.9Kohms |
| R26 | 2 ohms ± 1% |
| R28 | 150Kohms |
| R29 | 6.1 Mohms |
| R30 and | 5.6 ohms |
| R32 | 22 ohms |

The anode of diode D15 is connected to one side of resistor R12 of the power supply 10. The cathode of diode D15 is connected to the anode of diode D20, which, in turn, has its cathode connected to the cathode of diode D14. The anode of diode D14 is connected to one side of the primary winding 70 of autotransformer T1 which has its other side connected to the anode of diode D15. The anode of diode D14 is connected to the anode of diode D22 which has its cathode connected to a drain electrode of transistor Q5. The gate of transistor Q5 is connected to pin 6 of the pulse width modulator U2 via a series arrangement of resistor R32 and R19. The source electrode of transistor Q5 is connected to pin 3 of pulse width modulator U2 via resistor R20. The source of transistor Q5 is also connected to the other side of resistor R12 via resistor R26. One side of resistor R26 is also connected to the anode of diode D18 and to one side of capacitor C16. The cathode of diode D18 is connected to a junction formed by resistors R32 and R19. The other side of capacitor C16 is connected to pin 3 of pulse width modulator U2.

The autotransformer T1 has a secondary winding connected to pin 7 of pulse width modulator U2 by means of resistor R30 and forward conducting diode D11. The autotransformer has a secondary winding 68 having one end, shown at junction 66, connected to resistor R12 and its other end connected to the anode (A) electrode of the discharge lamp 42 by means of a serial arrangement of diodes D16 and D17 and resistor R24.

The pulse width modulator U2 has its pin 7 connected to one side of inductor L4, shown as junction 44, of the LC filter 20 by means of a serial arrangement formed by a forward conducting diode 21 having its cathode connected to the cathode of diode D19 by means of resistor R14, whereas, the anode of diode D19 is connected to the side of inductor L4. Pins 1 and 2 of pulse width modulator U2 are coupled together by means of a parallel arrangement of resistor R28 and capacitor C15. Pin 2 of the pulse width modulator U2 is connected to the anode electrode of lamp 42 by means of a serial arrangement of resistors R29 and R27.

Pin 4 of the pulse width modulator U2 is connected to the cathode (C) electrode of discharge lamp 42 by means of a capacitor C18 having one of its sides connected to one side of resistor R21 which has its other side connected to pin 8 of the pulse width modulator U2 and also to one side of capacitor C17 which, in turn, has its other end connected to the cathode electrode of discharge lamp 42. The cathode electrode of discharge lamp 42 is also connected to one side of resistor R22 which has its other side connected to a junction formed by resistors R28 and R29. Further, the cathode electrode of the discharge lamp 42 is connected to one side of capacitor C2 which has its other side connected to the junction formed by resistors R29 and R27 and also to the cathode of diode D12 which, in turn, has its anode connected to the anode electrode of the discharge lamp 42.

The glow power source circuit 14 includes transistors Q3 and Q4, resistors R9, R13, R15 and R18, capacitors C9 and C10, diode D8 and zener diode D10 arranged and connected as shown in FIG. 1. The components of the glow power source circuit 14 are of the type or have a typical value as given in Table 2.

TABLE 2

| | |
|---|---|
| Transistors | |
| Q3 and | MPS A44 |
| Q4 | 2N6 740 |
| Resistors | |
| R9 | 1 Mohm |
| R13 | 301 ohms ¼ W ± 1% |
| R15 and | 1Kohms |
| R18 | 270 ohms |
| Capacitors | |
| C9 and | 0.1 microfarads |
| C10 | 0.1 microfarads |
| Diode D8 | 1N914 |
| Zener diode D10 | 15 V 500 MW ± 5% |

One side of resistor R18 is connected to the output terminal 34 of the bridge rectifier 30. The other side of resistor R18 is connected to both of the collectors of transistors Q3 and Q4. The gate of transistor Q3, shown by reference number 82, is connected to (1) one side of capacitor C9, and (2) to the cathode of zener diode D10 and an anode of diode D8. The other side of capacitor C9 is connected to the gate of transistor Q4 and also to (1) one side of the capacitor C10, and (2) one side of resistor R15 which has its other side connected along with the other side of capacitor C10 to the emitter of transistor Q4. The anode of diode D10 is connected to one side of resistor R13 which has its other side connected to the emitter of transistor Q4. The cathode of diode D8 is connected to one side of resistor R9 which, in turn, has its other side connected to input 86 of comparator 58 of run circuit 16.

The run circuit 16 operates the gas discharge tube 42 under normal continuous conditions and includes field effect transistor Q1, comparator 58, resistors R6, R7, R10 R11 and R25, capacitor C6 and diode D9 which are arranged as shown in FIG. 1. The components of run circuit 16 are of a type or of a typical value as given in Table 3.

TABLE 3

| | |
|---|---|
| Transistor Q1 | N channel power Mosfet |
| Comparator 58 | MC 14574 |
| Resistors | |
| R6 | 1.87Kohms ± 1% |
| R7 | 150Kohms |
| R10 | 10Kohms |
| R11 and | 10 ohms ½ W ± 1% |
| R25 | 100 ohms |
| Capacitor C6 | 200 microfarads |
| Diode D9 | RG2A |

The input 86 of comparator 58 is also connected to one side of resistor R10 which has its other side connected to (1) one side of resistor R11, (2) the cathode diode D9, and (3) the source electrode of field effect transistor Q1. The anode of diode D9 is connected to the cathode electrode of the discharge lamp 42. The other side of resistor R11, shown at junction 90, is connected to one side of resistor R6 which, in turn, has its other side connected to an input 88 of comparator 58.

The input 88 is also connected to, (1) one side of resistor R7, (2) to one side of the capacitor C6, and (3) to one side of a resistor R8. The other side of resistor R7 is connected to (1) the output 100 of the comparator 58, and (2) to one side of a resistor R25 which has its other side connected to the gate electrode of the field effect transistor Q1. The transistor Q1 has its drain electrode connected to one side of the resistor R18 associated with resistors Q3 and Q4. The other side of capacitor C6 is connected to the output 100 of comparator 58. The other side of resistor R8 is connected to a resistor R16 of the glow transition timer 18.

The glow transition timer 18 includes transistor Q2, comparator 60, capacitor C5, resistors R1, R2, R4, R5, R8, R16, R17 and R23 and zener diode D5 all arranged as shown in FIG. 1. The components of the glow transition timer 18 are of a type or of a typical value as given in Table 4.

TABLE 4

| | |
|---|---|
| Transistor Q2 | 2N4401 |
| Comparator 60 | MC14574 |
| Capacitor C5 | 0.47 microfarads |
| Resistors | |
| R1 | 1 Mohm |
| R2 | 132Kohms |
| R4 | 20 Mohms |
| R5 | 2 Mohms |
| R8 | 100Kohms ± 1% |
| R16 | 470Kohms |
| R17 and | 200Kohms |
| R23 | 1 Mohm |
| Zener diode D5 | 10 V 500 MW ± 5% |

The comparator 60 has an input 96 which is connected across a voltage dividing network formed by resistors R4 and R5, which, in turn, are connected across capacitor C7 of the power supply circuit 10. The input 96 is also connected to one side of a capacitor C5 which has its other side connected to the capacitor C7. The capacitor C5 is also connected to the cathode of zener diode D5 having its anode connected to an input 98 of comparator 60. The input 98 is also connected to pin 3 of comparator 60 by means of resistor R1. The cathode of zener diode D5 is also connected to pin 5 of comparator 60.

The comparator 60 has its pins 8 and 9 connected together and also to one side of resistor R2 which has its other side connected to the emitter of transistor Q2. The emitter of transistor Q2 is connected to one side of resistor R23 which has its other side connected to the output of comparator 60, shown as junctions 80 and 84, and is also connected to one side of resistors R8 and R16. The other side of resistor R16 is connected to the gate electrode of transistor Q2. The collector of transistor Q2 is connected to one side of resistor R17 which, in turn, has its other side connected, by means of line 38, to the anode of diode D6 of the power supply circuit 10.

The emitter of transistor Q2 is connected, shown as junction 90, to one side of an inductor L3 having a typical value of 9 millihenries and comprising the ballast inductor 22. The other side inductor L3 is connected, shown at junction 92, to the LC filter network 20.

The LC filter network 20 is comprised of an inductor L4 having a typical value of 9 millihenries and a capacitor C14 having a typical value of 0.033 microfarads. One side of inductor L4 is connected to one of the electrodes of the discharge lamp 42 by means of the forward conducting diode D13. The other side of inductor L4 is connected to one side of capacitor C14 which has its other side connected to the other electrode of the arc discharge tube 42.

The overall interconnection of the circuit arrangement of FIG. 1 is provided, in part, by signal line 38. The output signal developed by rectifier 30 and present at terminal 34 is connected via signal line 38, to; (1) glow transition timer 18; (2) glow power source 14; and (3) run circuit 16. Further, junction 64 which is interconnected to terminal 34, is connected to one side of the primary winding 70 of the autotransformer T1. The output terminal 36 of the rectifier 30 is connected, via signal line 40, to junction 66 of the primary winding 68 of the transformer T1. Winding 68 of the autotransformer T1 is also connected to the, previously discussed, series combination of diodes D16 and D17, resistor R24, diode D12 and capacitor C2.

The output terminal 34 of rectifier 30 is also connected to the glow transition timer 18, via the previously discussed arrangement of diode D6 and resistor R3 connected in series, which, in turn, is connected to the parallel combination of zener diode D7 and capacitor C7. The output from the glow transition timer 18 is coupled at junctions 80 and 84 to the glow power source 14 at the gate electrode 82 of transistor switch Q3. Also the output of the glow transition timer 18 present at junction 84 is connected, via diode D8 and resistor R9, to the negative input terminal 86 of comparator 58 of run circuit 16. Further, the output at junction 78 of comparator 60 of timer 18 is coupled via resistor R8 directly to the positive input terminal 88 of comparator 58 of the run circuit 16. Run circuit 16 provides an output signal which present at junction 90, which is applied to ballast inductor L3. The LC filter 20 comprising capacitor C14 and inductor L4, couples the output from the ballast inductor L3, present junction 92 to one of the electrodes of the discharge lamp 42 by means of the diode D13.

OPERATION OF THE DIRECT CIRCUIT DISCHARGE LAMP

The overall operation of the circuit arrangement shown in FIG. 1 may be described with reference to the following main features that the arrangement accomplishes so as to correctly sequence and maintain the discharge lamp 42 during its desired operation.

(A) The High Voltage Supply and Discharge Sense Shutdown for the Discharge Lamp

At cold start or hot restart of the discharge lamp as discussed in the "Background" Section, a suitable voltage, such as a-c voltage of about 227 voltage, is applied to the terminals 24 and 26. The bridge circuit 30 rectifies the applied a-c input signal and provides a unidirectional d-c output signal at terminals 34 and 36. The d-c high voltage necessary to initiate the discharge of the arc tube 42 is developed by the autotransformer T1 and Q5 supplied by the d-c voltage developed by the bridge circuit 30 and present at junction 64. Q5 is rendered conductive or turned "on" and allows a current to increase in the primary winding 70 of autotransformer T1. Then Q5 is turned "off" by the operation of U2 to be described, and the current in the primary winding 70 suddenly goes to a zero condition creating a relatively large voltage pulse in both the primary and secondary windings of T1, having a value of 1500 volts and a duration of 2 microseconds. This voltage pulse appearing the secondary 68 is then rectified by D16 and D17 and applied to the discharge lamp 42 (shown as $V_S$ in the initial portion of FIG. 2(a)) along with being placed as an additional charge on C2.

The current build-up in the primary winding 70, and hence the magnitude of the resulting voltage pulse applied to the discharge lamp 42 is controlled by the operation of the pulse width modulator U2. Pulse width modulator first operates by sensing the voltage present on C2 by means of the voltage divider formed by R29 and R22, and accordingly adjusts the length of the time current flows in the primary winding 70 (and hence its peak magnitude) so that a desired level of d-c high voltage for a predetermined duration is maintained on capacitor C2 and at output terminal 72 located at one side of capacitor C2. The application of the high voltage causes an arc condition of the discharge lamp to be initiated (shown in FIG. 2a as a rapid fall of $V_S$), which, in turn, causes the lamp voltage present between the electrodes (and C2 voltage) to drop to a low value such as 20 volts. The pulse width modulator U2, senses this condition at junctions 72 and shuts itself off by an inherent routine within U2 until the discharge lamp 42 is turned off, and then on again, so to re-establish the d-c supply voltage at junctions 64 and 74.

(B) Glow to Arc Transition Mode of the Discharge Lamp

Once a discharge or arc condition of discharge lamp has been initiated, the glow transition timer 18 is enable (shown in FIG. 2(d) as the sudden rise of $V_T$) and generates a predetermined specific glow time interval such as 1 second. The enable signal for timer 18 is developed by the occurrence of a sudden drop in voltage present at junction 76 which is created by the discharge initiation of the discharge lamp 42. This sudden voltage drop allows current to flow through D6 and R3 causing a rapid building-up or increase of a control voltage appearing across C7 which is limited and regulated by D7. The d.c. voltage of C7 causes the integrated circuit U1 comprising comparators 58 and 60 to be activated which may be explained with reference to FIG. 2(a).

At a first condition between 0.5 to 1.5 second related to FIG. 2(a), the output of the comparator 60 present at junction 78 (pin 1 of integrated circuit U1) is at a low condition, which maintains Q2 in an "off" condition and the output of the timer 18 present at junction 80 is in a "high" condition, as shown in FIG. 2(a) with reference to transition voltage $V_t$ which is present at junction 80. This high condition of junction 80 permits the glow power source 14 to supply a steady state, relatively small amount of direct current $I_t$ shown in FIG. 2(b), herein termed glow current, to the discharge lamp 42 by way of output junction 76, ballast inductor L3, filter inductor L4 and diode D13. Simultaneously with the small flow of current, the timer circuit 18 disables the run circuit 16 applying a "low" condition output at junction 100 (which renders transistor Q1 non-conductive). The magnitude of the glow current $I_t$ of FIG. 2(b) is controlled or regulated by the circuitry of the glow power source 14 comprising the Darlington emitter follower, Q3 and Q4, the zener diode D10, and the resistor R13. The regulation is accomplished by the zener diode D10 supplying a regulated reference voltage to the input of the Darlington emitter follower comprised of Q3 and Q4. The emitter of Q4 mirrors or follows this voltage and keeps the current in R13 and hence the lamp glow current constant.

Figure 2:
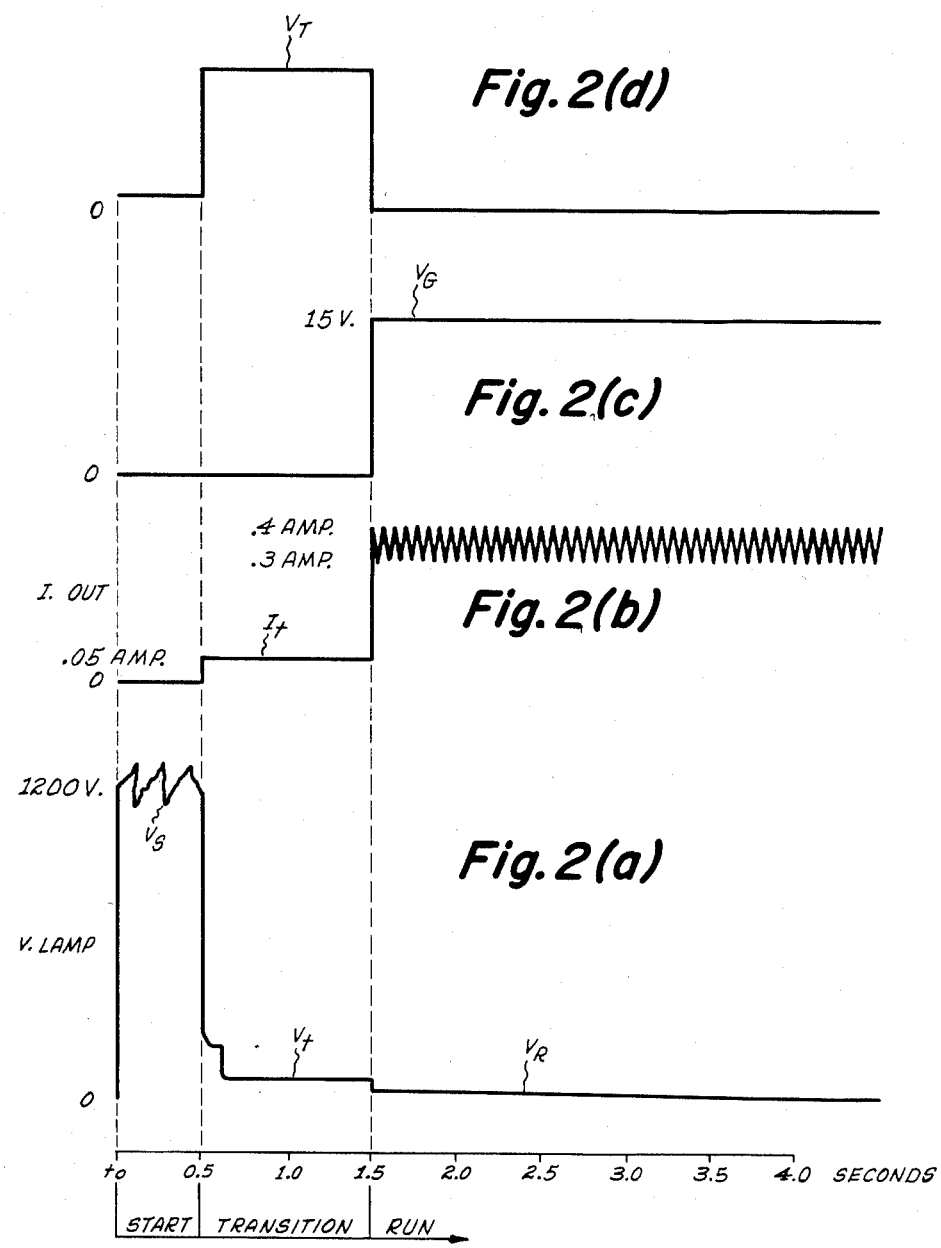
FIGS. 2(a), 2(b), 2(c) and 2(d) are timing diagrams illustrating current and voltage waveforms related to several locations in the circuit of the present invention.

The duration of the glow interval that is, the transition section shown in the bottom of FIG. 2, is controlled by the time constant established by C5 and R5 at the input stage of comparator 60 of the glow transition timer circuit 18. The capacitor C5, originally at a very low voltage during the discharge initiation of the arc tube 42, increases its stored voltage through the path provided by R5. The charging of C5 forces the voltage of negative input 96 of comparator 60 of integrated circuit U1 (pin 2) to be lowered until it is at the same potential as positive input 98 of comparator 60. At this instant occurring at about this 1.5 second point of FIG. 2, the output 78 of comparator 60 goes to a "high" condition, which, in turn, causes two conditions; (1) Q2 is turned-on, which, in turn, inhibits the glow current developed by the Darlington emitter followers Q3, and Q4 and; (2) simultaneously, the high output of comparator 60 present at junction 78 is applied to input 88 of comparator 58, which, in turn enables or activates the run control circuit 16 by rendering transistor Q1 conductive. The glow interval thus allows a small regulated, d-c current, $I_t$ of FIG. 2(b) to flow in the discharge lamp 42 for a controlled short period established by the time constant of C5 and R5 so as to heat up the electrodes and allow the lamp to transition from its glow mode into its run mode.

(C) Run Mode and Filtering for the Discharge Lamp

Once the run circuit 16 has been enabled occurring at the 1.5 second point of FIG. 2 and the zero time point of FIG. 3, so as to initiate the run mode of the discharge lamp, the glow power source 14 is turned-off signifying termination of the glow mode of the discharge tube, and an oscillatory control sequence is initiated. The run circuit operates (1) by first supplying a d-c electrical increasing current to the arc discharge lamp until a predetermined high limit is reached, (2) then supplying a d-c electrical decreasing current until a predetermined low limit is reached and (3) continuing in a cyclic manner the increasing and decreasing currents so as to establish an average current to the arc discharge lamp.

The run circuit 16 first operates such that power switch Q1 is turned on by comparator 60 thereby connecting the output 90 of the run circuit to the plus d-c supply rail comprised of elements having reference numbers 34, 64, 38 and 94 shown in FIG. 1 which is in series with the small sensing resistor R11. The occurrence of the turn-on of Q1 is shown in FIG. 2(c) as the sudden rise of $V_G$. This turn-on of switch Q1 allows current flow in the discharge lamp 42 to increase linearly from the low value $I_t$ of FIG. 2(b), formerly supplied by the glow power source 14, to a value $I_R$ desired for the run mode of operation shown in FIG. 3(a) as the 0.4 amp quantity. The current increase is linear because of the constant impedance offered by the ballast inductor L3 between junctions 90 and 92. This linearly increasing current is sensed by R11, and when a prescribed maximum value such as 0.4 amperes is reached, the voltage across R11 is high enough to raise the negative input 86 of comparator 58 to the circuit trip point established by the difference between inputs 88 and 86, whereby comparator 58 is rendered conductive, and the output 100 of comparator 58 goes to a low condition, which, in turn, renders the power switch Q1 off or non-conductive.

The current flow of the discharge lamp 42 continues to flow through R11, L3, L4, D13, the lamp 42 itself, and back through D9. This current, supplied by the energy previously stored in L3, decays linearly to a predetermined minimum value of 0.3 amperes. When this low value, sensed by R11, reaches some predetermined lower limit such as 0.3 amperes, the comparator 58 is below its trip point condition and the output 100 of comparator 58 goes to a high condition again and turns-on the power switch Q1. This cycle is repeated again and again to produce a triangular current wave shape $I_R$ of FIG. 3a flowing within L3 and varying between specific maxima and minima such as 0.4 amp and 0.3 amp respectively. The average of such current IA is shown in FIG. 3a as having a value of about 3.5. It should be noted that there are no resistive elements in this power circuit to absorb energy, only the discharge lamp 42 itself consumes any appreciable power, and accordingly, the lamp control process is extremely efficient. The frequency of this oscillatory ripple shown in FIG. 3(a) is kept above the audible range so to eliminate any possible disturbing hum related to the arc discharge tube 42.

The ripple component of the current in the ballast inductor L3 has been found to be detrimental to arc discharge tube performance, especially discharge stability and lamp life. The L-C network 20, the inductor L4, and the filter capacitor C14 filters and reduces the variation in discharge lamp current (and hence voltage) to insignificant levels and provides essentially a d-c current $I_{LAMP}$ having an average value of about 0.35 amps as shown in FIG. 3(b) and the voltage $V_R$ shown in FIG. 2a to arc discharge lamp 42.

It should now be appreciated that the present invention provides a lamp operating circuit shown in FIG. 1 for operating d-c discharge lamps which allows for efficient operation of the lamps in all its described modes.

What we claim as new and desire to secure by Letters Patent of the United States is:

1. A controlled power supply circuit for supplying d-c power to an arc discharge lamp comprising:
   means for applying a relatively high voltage d-c potential to the arc discharge lamp for a first predetermined relatively short time interval;
   means for first supplying a d-c electrical current at a first predetermined current level to said said arc discharge lamp for a second predetermined time interval; and
   means for supplying a d-c electrical increasing current to said arc discharge lamp until a predetermined high limit is reached, then supplying a d-c electrical decreasing current until a predetermined low limit is reached, and continuing in a cyclic manner said increasing and decreasing d-c current so as to establish an average d-c current to said arc discharge lamp.

2. The controlled power supply circuit according to claim 1 wherein said means for applying a high voltage d-c potential includes a starting circuit comprising:
   a rectifier adapted to be connected to a source of a-c power and develop a rectifier d-c output signal
   an autotransformer connected across the output of said rectifier;
   a switching transistor for controlling the current flow through said autotransformer;
   current sensing means for detecting the current flow through the arc discharge lamp; and
   controller means for controlling the duration of on and off states of said switching transistor.

3. The controlled power circuit according to claim 2 wherein said means for supplying a d-c electrical current at a predetermined first current level comprises:
   a glow transition timer circuit for receiving said rectified d-c signal and providing in response to said rectified d-c signal a timing control output signal; and
   a glow power source for receiving said timing control output signal and supplying in response to said timing control output signal a d-c signal of first predetermined voltage and a first predetermined current to said arc discharge lamp for a time period determined by said timing control output signal.

4. The controlled power circuit according to claim 3 wherein said means for supplying an increasing then decreasing d-c electrical current for the predetermined high and low current limits comprises:
   a run circuit for receiving said rectified d-c signal;
   switching means for controlling the current applied to the arc discharge lamp; and
   comparator means for receiving said timing control output signal of said glow transition timer and providing in response to the difference between said timing control output signal and a signal representative of the current flow in said arc discharge lamp a switching control output signal which is applied to said switching means so as to provide said cyclic control of said increasing and decreasing current to said gas discharge lamp.

* * * * *